United States Patent [19]

Scaduto

[11] 3,858,482
[45] Jan. 7, 1975

[54] CUTTING DEVICE FOR FORMING POLYGONAL SHAPED OPENINGS

[76] Inventor: John R. Scaduto, 14460 E. State Fair, Detroit, Mich. 48205

[22] Filed: Dec. 5, 1973

[21] Appl. No.: 421,997

[52] U.S. Cl. .................. 90/24 R, 82/1.3, 279/6, 279/20
[51] Int. Cl. ............................................ B23d 13/00
[58] Field of Search ............ 279/6, 16, 18, 20, 1 R; 90/63, 24 R; 82/1.3

[56] References Cited
UNITED STATES PATENTS
1,148,065   7/1915   Warren .............................. 90/24 R
2,276,945   3/1942   Ehrich .................................. 279/6

Primary Examiner—Gil Weidenfeld
Attorney, Agent, or Firm—Harness, Dickey & Pierce

[57] ABSTRACT

A tool holder has a shank which is mounted in a non-rotatable support which is longitudinally movable toward and from the work. The opposite end of the tool holder has a spindle mounted therein for rotation and provided with a central aperture in which the shank of a broach is secured. The axis of the broach is offset one degree from the axis of the holder which produces a wobble effect to the corners of the broach seriatim to produce rapid cutting of a hole to a predetermined shape. Such shape is of polygonal regular or irregular form developed by the broach. The work piece is rotated and the broach is advanced into engagement with the end face thereof and continually advanced until the broaching operation is completed.

7 Claims, 3 Drawing Figures

Patented Jan. 7, 1975
3,858,482
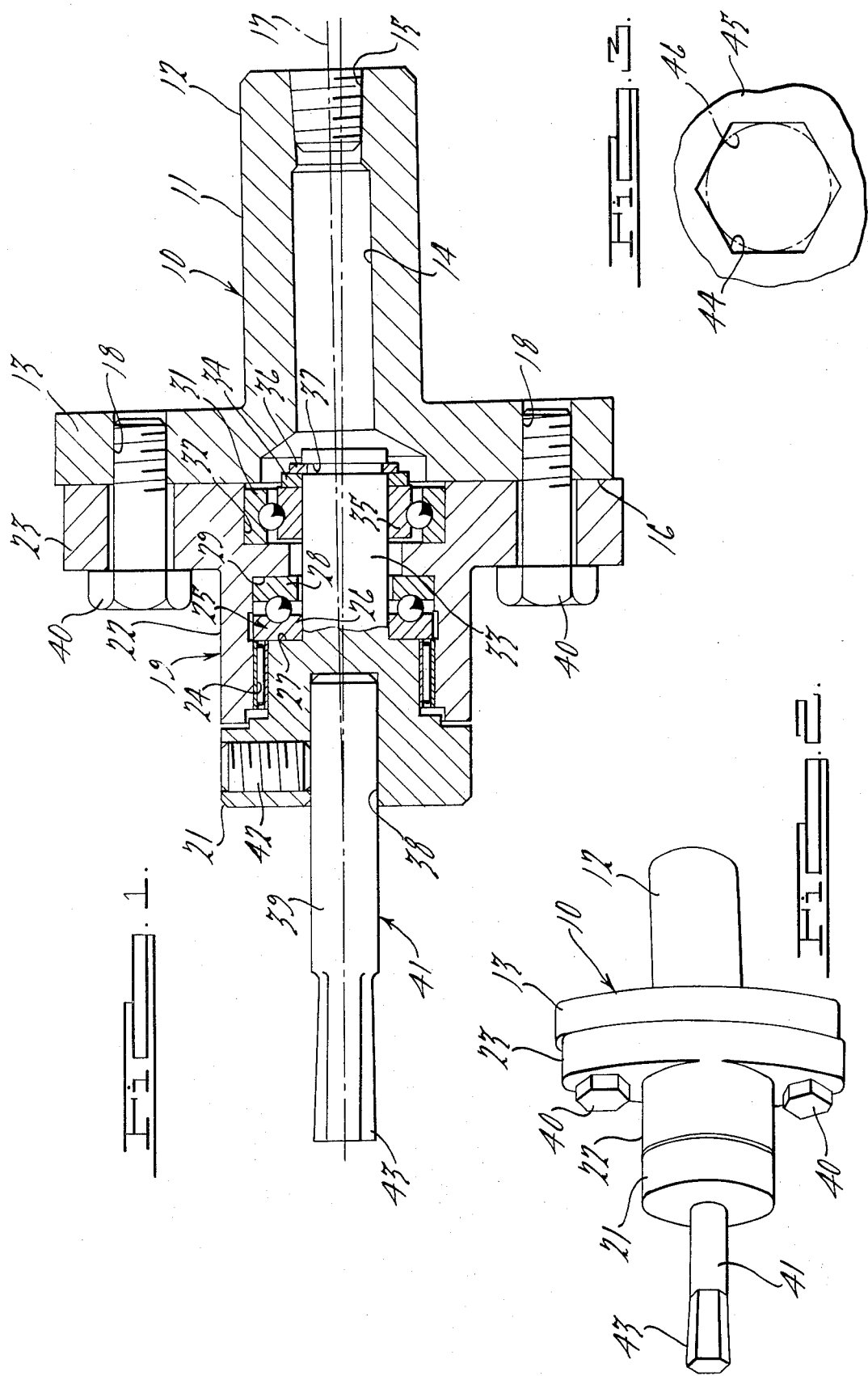

CUTTING DEVICE FOR FORMING POLYGONAL SHAPED OPENINGS

BACKGROUND OF THE INVENTION

Broaching operations have been performed heretofore by advancing an elongated broach of predetermined cross section across or through a work piece to plane the surface thereof or to enlarge the opening, form lands and groups, key slots and the like. Rotation has been imparted to the broach when following a helical path. In the present arrangement the broach is freely rotatable on the holder and a wobble effect it produces thereto by a slight angular offset of the broach's axis relative to the axis of the holder.

SUMMARY OF THE INVENTION

The invention pertains to a tool holder having a shank of a selected diameter to be mounted in a tail stock, a turret, or other supporting means by which the holder may be advanced toward the work piece. The spindle which supports the broach is freely rotatable in the holder and its axis is offset from the axis of the holder approximately one degree. This produces a wobble effect at the corners of the broach which produces a slight advancement additionally to the feed movement to produce cutting at each individual corner to produce a machined surface which is compatible with a standard acceptable surface. The spindle has a needle bearing thereabout and a shoulder in engagement by a thrust bearing so that the spindle may readily rotate while a substantial end force is applied thereto. The broach may be employed on a screw machine, turret lathe, a multiple spindle automatic machine, or any machine that can rotate the work and support the tool holder for advancement theretoward. The broach can perform external and internal operations of regular or irregular shapes, axial knurls, hexagon and square shapes as well as slotted configurations.

A BRIEF DESCRIPTION OF THE DRAWING

FIG. 1 is a sectional view of a tool holder with a broach therein embodying features of the present invention.

FIG. 2 is a reduced view in elevation of the structure illustrated in FIG. 1, and FIG. 3 is a broken view of a work piece showing a hexagon hole broached in the end thereof which contained a cylindrical aperture.

DESCRIPTION OF THE PREFERRED EMBODIMENT

The tool holder 10 of the present invention embodies an adaptor 11 having a cylindrical shank 12 and an oval shape flange 13. An aperture 14 extends into a shank 12 which terminates at the end in a pipe thread 15 by which a flexible line may be secured for delivering oil or a coolant to the cutting end of the broach. The front face 16 of the flange 13 is disposed at an angle of one degree to the axis 17 of the shank 12. The two tapped holes 18 at the ends of the flange likewise have the axes disposed at an angle of one degree to the axis of the shank so as to be normal to the face 16 of the flange 13. A holder 19 for a rotary broach supporting spindle 21 has a cylindrical body 22 and an oval shaped flange 23. A needle bearing 24 is mounted between the spindle 21 and the inner wall of the cylindrical body 22. A thrust bearing 25 has a race 26 engaging a shoulder 27 on the spindle 21 and a second race 28 engaging a shoulder 29 thereof. A ball bearing 31 engages an inner wall 32 of the flange 23 and the end surface of the stub shaft 33 of the spindle 21. A washer 34 engages the inner race 35 of the bearing 31 and is retained in positive engagement therewith by a snap ring 36 disposed within an annular slot 37 near the end of the stub shaft 33. A pair of screws 40 extend through aperture in flange 23 into the threaded aperture 18 for clamping the flange 13 and 23 in fixed engaged relation. All of the parts are retained in unit relation permitting the spindle 21 to freely rotate and be forced with considerable pressure toward the work piece without damage to the parts in view of the thrust bearing 25. The spindle 21 has an aperture 38 for the shank 39 of a broach 41. The shank is retained in the aperture by a set screw 42. The broach end 43 is of hexagon shape for producing a hexagon aperture 44 in the end of a work piece 45 as illustrated in FIG. 3. In view of the face 16 of the flange 13 being offset one degree from the axis 17 of the shank 12, the axis of the broach is disposed at an angle of 1° from the axis of the shank. The work piece 45 rotated and the cylindrical aperture 46 in the end thereof will have its axis aligned with the axis of the broach so that when the end of the broach is advanced toward the rotating work piece, the corners will engage the work piece at the aperture to cut the corners therein in a progressive manner. The wobble effect of the end face of the broach will cause the corners to advance serially to produce the cutting operation as the work and broach are rotating and the broach advanced until the operation is completed.

What is claimed is:

1. In a cutting device for forming a polygonal shaped opening in a work piece comprising; an adaptor having a supporting shank and a flange at one end, a holder having a flange supported on said adaptor flange, a spindle rotatably supported in said holder and provided with a central aperture, an elongated cutting tool having an end face of polygonal cross section, and means for securing said cutting tool in said aperture for rotation by the work piece which is driven in rotation the axis of said cutting tool being disposed at an angle to the axis of the supporting shank.

2. In the cutting device as recited in claim 1, wherein the angle between the axes is approximately 1° to produce a slight movement between the cutting edges at the end of the cutting tool and the work piece.

3. In the cutting device as recited in claim 1, wherein said spindle has a cutting tool receiving aperture and a stub shaft, said holder having an enlarged chamber, a needle and a thrust bearing between the spindle and holder, a ball bearing between the holder and stub shaft, and means retaining the stub shaft secured to the inner race of the ball bearing.

4. In the cutting device as recited in claim 3, wherein said securing means embodies a washer on said stub shaft, said stub shaft having an annular slot near the end, and a split ring in said slot.

5. In the cutting device as recited in claim 4, wherein said supporting shank has a central aperture with an internal tread at the outer end thereof.

6. In the cutting device as recited in claim 1, wherein said housing and adaptor have aligned flanges the mating face of one flange being disposed at an angle to the axis of the supporting shank, and means for securing said flanges together.

7. In the cutting device as recited in claim 6, wherein said securing means embodies aligned apertures in said flanges, the apertures in the flange having its face disposed at an angle to the axis of the supporting shank being threaded on an axis which is normal to said face.

* * * * *